United States Patent [19]

Adachi et al.

[11] Patent Number: 4,754,854
[45] Date of Patent: Jul. 5, 1988

[54] PIN BOOT PROTECTOR IN DISC BRAKE ASSEMBLY

[75] Inventors: Yoshiharu Adachi, Gamagoori; Fumio Fujimori, Anjo; Toshio Kondo, Okazaki; Hiroshi Uemura, Okazaki; Juichi Shibatani, Toyota, all of Japan

[73] Assignees: Aisin Seiki Kabushiki Kaisha; Toyota Jidosha Kabushiki Kaisha, both of Toyota, Japan

[21] Appl. No.: 4,787

[22] Filed: Jan. 8, 1987

Related U.S. Application Data

[63] Continuation-in-part of Ser. No. 732,573, May 10, 1985, abandoned.

[30] Foreign Application Priority Data

May 10, 1984 [JP] Japan ................. 59-068516

[51] Int. Cl.⁴ ............................................. F16D 65/14
[52] U.S. Cl. .................... 188/73.45; 74/18.2; 137/154; 188/73.44; 277/212 FB; 277/237 A; 277/DIG. 4
[58] Field of Search .......................... 188/73.44, 73.45; 74/18.2; 277/212 R, 212 FB, 237 A, DIG. 4; 137/854, 855

[56] References Cited

U.S. PATENT DOCUMENTS

| Re. 29,582 | 3/1978 | Brown .............................. 188/73.45 |
| 1,885,121 | 11/1932 | Loweke ........................... 74/18.2 X |
| 3,381,987 | 5/1968 | Husen ........................ 277/212 FB X |
| 3,441,298 | 4/1969 | Herbenar et al. ......... 277/212 FB X |
| 3,954,027 | 5/1976 | Soderberg et al. ....... 277/212 FB X |
| 4,392,560 | 7/1983 | Nakasu et al. ............... 188/73.45 X |
| 4,418,797 | 12/1983 | Fujimori ..................... 188/73.45 X |
| 4,458,790 | 7/1984 | Hoffman, Jr. et al. ...... 188/73.44 X |
| 4,469,337 | 9/1984 | Yokoi et al. ................. 188/73.44 X |
| 4,506,768 | 3/1985 | Innocent .................... 277/212 FB X |
| 4,611,694 | 9/1986 | Hickson et al. ................... 188/73.45 |

FOREIGN PATENT DOCUMENTS

| 0076729A1 | 4/1983 | European Pat. Off. |
| 76227 | 6/1980 | Japan ................................. 188/73.44 |
| 56-2431 | 1/1981 | Japan . |
| 58-79142 | 5/1983 | Japan . |

Primary Examiner—George E. A. Halvosa
Attorney, Agent, or Firm—Oblon, Fisher, Spivak, McClelland & Maier

[57] ABSTRACT

A disc brake assembly includes a stationary support member mounted on a vehicle body structure and having at least one support pin fixed thereto, a caliper member slidably supported on the support pin to be movable in an axial direction, and a tubular elastic boot arranged in surrounding relationship with the support pin to enclose a sliding portion on the same. To protect the elastic boot, a cylindrical elastic protector is arranged to contain therein the elastic boot, the elastic protector having one end coupled with a member such as a washer or a cup-shaped member fixed to the outer end of the support pin and the other end pressed into contact with an end face of the support portion of the caliper member.

4 Claims, 2 Drawing Sheets

PIN BOOT PROTECTOR IN DISC BRAKE ASSEMBLY

This application is a continuation-in-part of application Ser. No. 732,573, filed May 10, 1985, now abandoned.

BACKGROUND OF THE INVENTION

1. Field of the Invention

The present invention relates to a disc brake assembly for wheeled vehicles, and more particularly to a pin boot protector in a disc brake assembly of the pin slide type which includes a stationary support member mounted on a vehicle body structure and having at least one support pin fixed thereto, a caliper member slidably supported on the support pin and movable in an axial direction, and a tubular elastic boot arranged in surrounding relationship with the support pin, the caliper member straddling a portion of a rotary brake disc secured for rotation with a road wheel of the vehicle and having a fluid actuator on one side thereof to press the friction pad of an inner brake shoe against one face of the brake disc and a reaction portion on the opposite side thereof to press the friction pad of an outer brake shoe against the other face of the brake disc by reaction force caused by actuation of the fluid actuator.

2. Discussion of the Background

In Japanese Utility Model Early Publications Nos. 56-2431 and 58-79142, there has been proposed such a conventional disc brake assembly of the pin slide type as described above, wherein a cup-shaped rigid protector is arranged to enclose the tubular elastic pin boot for protection of the same. The cylindrical rigid protector, however, is fixed at its one end to either the caliper member or the stationary support member and opens outwardly at its other end because of the lack of elasticity thereof. The cup-shaped rigid protector is also formed short in length to avoid interference with the stationary support member or the caliper member when both friction pads have been defaced so as to cause displacement of the caliper member. For these reasons, the cup-shaped rigid protector is ineffective to prevent entry of foreign particles such as sand, mud and the like therein. If the foreign particles are accumulated within the cup-shaped rigid protector, the tubular elastic boot will be damaged by friction caused by the accumulated foreign particles during sliding movement of the caliper member on the support pin.

SUMMARY OF THE INVENTION

It is, therefore, a primary object of the present invention to provide an improved pin boot protector capable of protecting the tubular elastic boot from damage by small stones and preventing entry of the foreign particles therein.

According to the present invention, the object is attained by providing a disc brake assembly of the pin slide type wherein a cylindrical elastic protector is arranged to contain therein the tubular elastic pin boot, the elastic protector having one end fixed to the outer end portion of the support pin or a member secured thereto and the other end fixed to the supported portion of the caliper member or a member secured thereto. In the case where the support pin is in the form of a hollow pin fixed to the stationary support member by means of a fastening bolt threaded through an washer or a cup-shaped member into the stationary support member, it is preferable that the cylindrical elastic protector is coupled at the one end thereof with the washer or the cup-shaped member and pressed at the other end thereof into contact with an end face of the supported portion of the caliper member. The cylindrical elastic protector is effective to reliably protect the tubular elastic pin boot from damage by small stones and to prevent entry of foreign particles such as sand, mud and the like into the space between the protector and the pin boot. Such function of the elastic protector will be maintained without causing any interference with the adjacent member even when both the friction pads have been defaced.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

Figure 1:
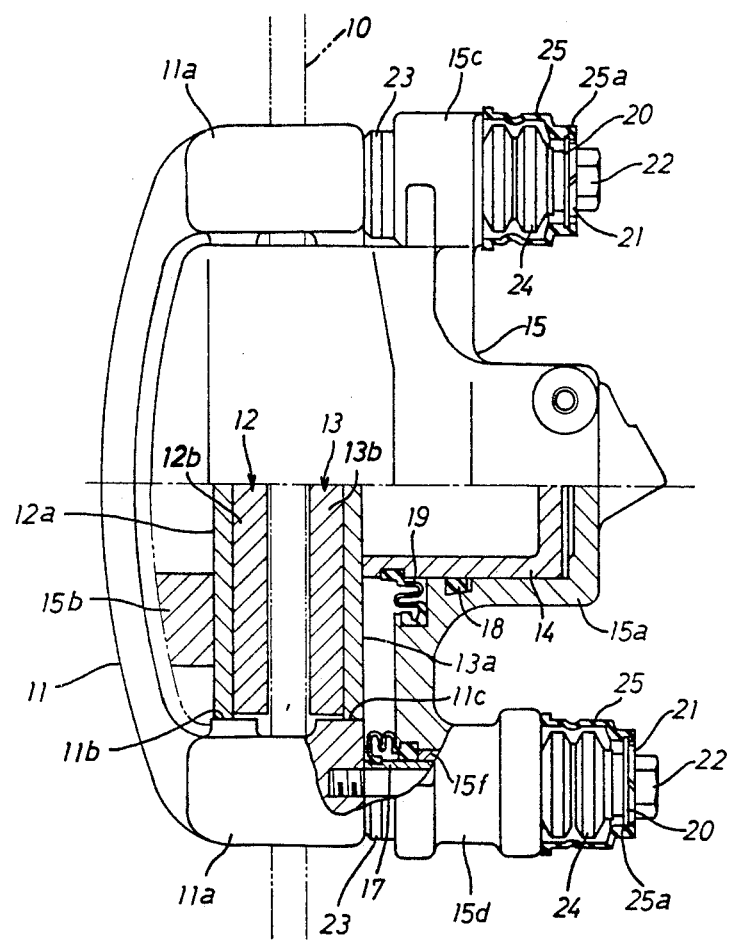
FIG. 1 is an elevation partly in section of a disc brake assembly of the pin slide type in accordance with the present invention.
Figure 2:
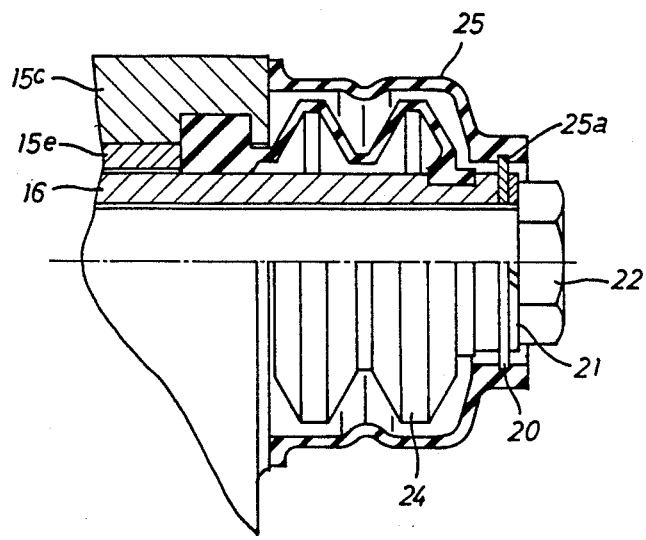
FIG. 2 is a partly enlarged sectional view of FIG. 1.

In FIGS. 1 and 2 of the appended drawings, there is illustrated a disc brake assembly of the pin slide type in accordance with the present invention which includes a rotary brake disc 10 secured for rotation with a road wheel of an automotive vehicle, a stationary support member 11 fixedly mounted on a body structure of the vehicle such as a knucle member at the inside of brake disc 10, outer and inner brake shoes 12 and 13 carried on the stationary support member 11 and arranged at the opposite sides of brake disc 10, a caliper member 15 straddling a portion of brake disc 10, and a pair of parallel support pins 16 and 17 fixed to the stationary support member 11 to support thereon the caliper member 15.

The stationary support member 11 has a pair of arms 11a, 11a straddling the brake disc 10 and is formed with a pair of recessed portions 11b and 11c wherein backing plates 12a and 13a of the brake shoes 12, 13 are respectively assembled to be axially movable. The brake shoes 12 and 13 are respectively provided with outer and inner friction pads 12b and 13b secured to the backing plates 12a and 13a. The caliper member 15 has a C-shaped cross-section for straddling the brake disc 10 and both the brake shoes 12, 13 and has a cylinder body 15a and a reaction portion 15b. The caliper member 15 is integrally formed at opposite sides thereof with a pair of arms 15c and 15d which are slidably supported on the support pins 16 and 17 to be movable in the axial direction of brake disc 10. Within a cylindrical bore formed in the cylinder body 15a, a cup-shaped piston 14 is axially slidably disposed through an annular sealing member 18 to press the inner brake shoe 13 directly against one face of the brake disc 10. The annular sealing member 18 has a well-known function for retracting the piston 14 in response to release of pressurized fluid applied thereto. An annular elastic boot 19 is disposed to enclose the sliding portion between piston 14 and cylinder body 15a.

The support pins 16 and 17 each are in the form of a hollow pin which is fixed to the stationary support member 11 by means of a fastening bolt 22 threaded into the support member 11 through a flat washer 20 and a spring washer 21. Both the caliper arms 15c and 15d are integrally provided therein with sleeve like bearing metals 15e and 15f, respectively. Both the support pins 16 and 17 are respectively provided thereon with tubular elastic pin boots 23 and 24 which are arranged to protect the sliding portions between support pins 16, 17 and caliper arms 15c, 15d. The elastic pin boots 23 and 24 each are fixedly engaged at their one ends with annular grooves formed on the respective support pins 16, 17 and at their other ends with annular grooves formed in the respective caliper arms 15c, 15d.

In this embodiment, it is noted that a pair of cylindrical elastic protectors 25, 25 are arranged in surrounding relationship with the respective elastic pin boots 24, 24 to contain therein them. Each cylindrical elastic protector 25 has one end portion formed in its inner wall with an annular groove 25a in engagement with the flat washer 20 and the other end portion pressed into contact with each end face of the caliper arms 15c, 15d to close the interior of protector 25 for permitting the flow of air outwardly from the interior of said protector 25 when compressed by axial movement of said caliper member 15 on said support pins 16, 17. Thus, the cylindrical elastic protectors 25, 25 are arranged to be expandable and contractible in accordance with axial movements of the respective caliper arms 15c, 15d on support pins 16, 17.

As is understood from the above description, the opposite ends of each elastic protector 25 are closed to prevent entry of foreign particles such as sand, mud and the like into the protector 25. In case the caliper member 15 has become displaced due to defacement of the friction pads 12b, 13b, the function of protector 25 for protecting the pin boot 24 will be maintained without causing any interference with the adjacent member. During the mounting process of the disc brake assembly, the cylindrical elastic protectors 25, 25 each are easily assembled in place by engagement with the flat washer 20 at its annular groove 25a after the support pins 16, 17 are fixed to the stationary support member 11 by fastening bolts 22, 22 to assemble in place the caliper member 15 and its associated parts. Owing to such effective use of the washers 22, 22, the present invention can be practiced at a low cost.

Figure 3:
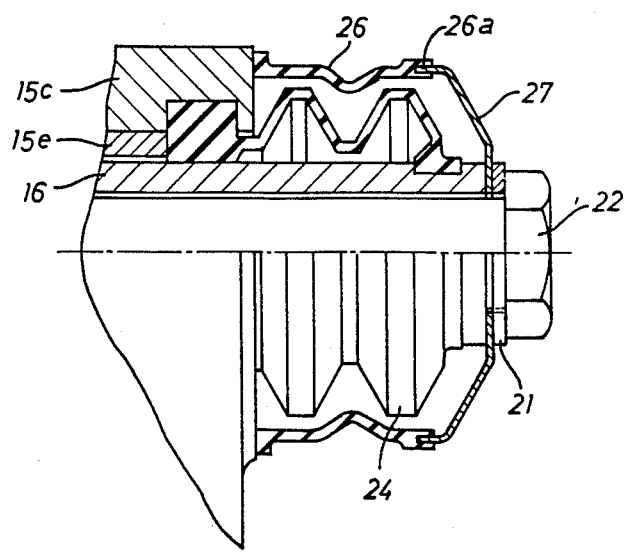
FIG. 3 is a partly enlarged sectional view of another embodiment of the present invention.

In the actual practice of the present invention, the cylindrical elastic protector 25 may be replaced with a tubular elastic protector 26 as shown in FIG. 3. In this modification, the tubular elastic protector 26 has one end portion formed with an annular groove 26a in engagement with an annular opening end of a cup-shaped washer like member 27 without any additional machining of the associated component parts and the other end portion pressed into contact with the end face of caliper arm 15c free of positive radial constraint toward said support pin. The cup-shaped member 27 is fastened in place by the bolt 22. Alternatively, the one end of protector 25 or 26 may be directly fixed to the outer end of respective support pins 16, 17 while the other end of protector 25 or 26 may be engaged with a member secured to the caliper arm.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A disc brake assembly for a wheeled vehicle including a stationary support member mounted on a body structure of the vehicle and having at least one support pin fixed thereto, a caliper member slidably supported on said support pin and movable in an axial direction, said caliper member straddling a portion of a rotary brake disc secured for rotation with a road wheel of the vehicle and having a fluid actuator on the one side thereof to press the friction pad of a first brake shoe against one face of said brake disc and a reaction portion on the opposite side thereof to press the friction pad of a second brake shoe against the other face of said brake disc by a reaction force caused by actuation of said fluid actuator, and a tubular elastic boot arranged in surrounding relationship with said support pin to unclose sliding portions on the same, wherein a cylindrical elastic protector is arranged to contain therein said elastic boot, said elastic protector having one end portion coupled with a member fixed to an outer end of said support pin and an opposite end face pressed into contact with an end face of the supported portion of said caliper member free of positive radial constraint toward said support pin for permitting the flow of air outwardly from the interior of said protector when compressed by axial movement of said caliper member on said support pin.

2. A disc brake as recited in claim 1, wherein said support pin comprises a hollow pin and further comprising a fastening bolt threaded into said stationary support member and a washer in engagement with the outer end of said support pin for fixing said hollow pin to said stationary support member, and wherein said elastic protector is coupled at said one end thereof with said washer without any additional parts for attachment thereof and pressed at said opposite end face into contact with said end face of the supported portion of said caliper means for permitting the flow of air outwardly from the interior of said protector when compressed by axial movement of said caliper member on said support pin.

3. A disc brake assembly as recited in claim 1, wherein said support pin comprises a hollow pin and further comprising a fastening bolt for fixing said hollow pin to said stationary support member wherein said fastening bolt is threaded into said stationary support member through a cup-shaped member in engagement with said outer end of said support pin, and wherein said cylindrical elastic protector is coupled at said one end thereof with an annular opening end of said cup-shaped member without any additional machining of the associated component parts and pressed at said opposite end face into contact with said end face of the supported portion of the said caliper member for permitting the flow of air outwardly from the interior of said protector when compressed by axial movement of said caliper member on said support pin.

4. A disc brake assembly for a wheeled vehicle including a stationary support member mounted on a body structure of the vehicle and having a pair of support pins fixed thereto, a caliper member slidably supported on said support pins and movable in an axial direction, said caliper member straddling a portion of a rotary brake disc secured for rotation with a road wheel of the vehicle and having a fluid actuator on one side thereof to press the friction pad of an inner brake shoe against one face of said brake disc and a reaction portion on the opposite side thereof to press the friction pad of an outer brake shoe against the other face of said brake disc by reaction force caused by actuation of said fluid actuator, and a pair of tubular elastic boots arranged respectively in surrounding relationship with said support pins to enclose sliding portions on the same, wherein a pair of cylindrical elastic protectors each are arranged to contain therein said elastic boots respectively, said elastic protectors each having one end coupled with a member fixed to an outer end of said support pins without any additional parts for attachment thereof and an opposite end pressed into contact with an end face of the supported portion of said caliper member free of positive radial constraint toward said support pins and for permitting the flow of air outwardly from the interior of said protector when compressed by axial movement of said caliper member on said support pins.

* * * * *

UNITED STATES PATENT AND TRADEMARK OFFICE
CERTIFICATE OF CORRECTION

PATENT NO. : 4,754,854
DATED : July 5, 1988
INVENTOR(S) : Yoshiharu ADACHI et al It is certified that error appears in the above-identified patent and that said Letters Patent is hereby corrected as shown below:

Column 1, line 67, change "an" to --a--.

Column 2, line 38, change "knucle" to --knuckle--.

On the Title Page, Item [73]:

The first Assignee, Aisin Seiki Kabushiki Kaisha, is located in Kariya, Japan, not Toyota.

Signed and Sealed this

Eleventh Day of July, 1989

Attest:

DONALD J. QUIGG

Attesting Officer

Commissioner of Patents and Trademarks